United States Patent Office 2,941,790
Patented June 21, 1960

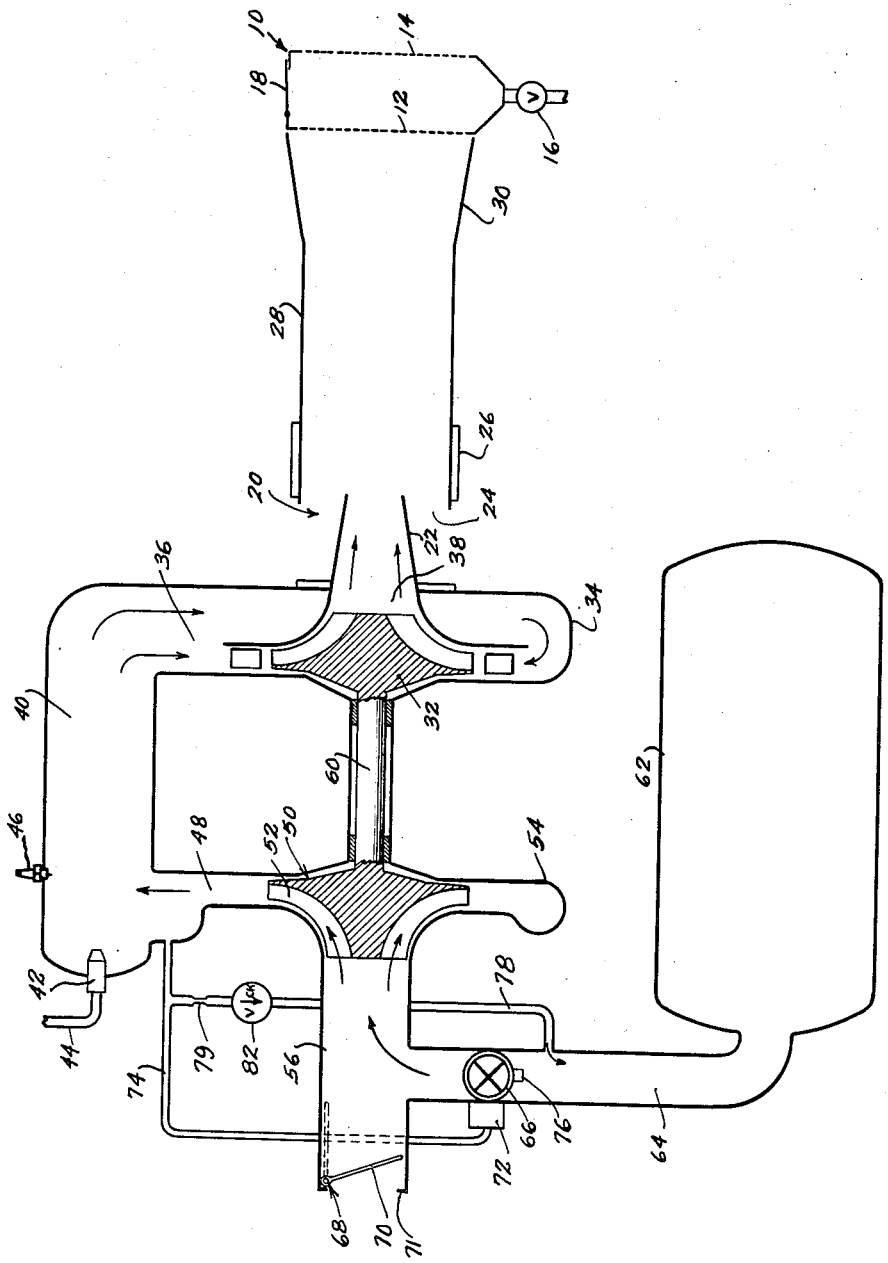

2,941,790

GAS TURBINE ENGINE ACTUATED STARTER AND DRYER

William A. Compton, Euclid, and Harvey A. Cook, Chagrin Falls, Ohio, assignors to Thompson Ramo Wooldridge Inc., a corporation of Ohio Filed May 1, 1957, Ser. No. 656,424

8 Claims. (Cl. 263—19)

The present invention relates to an improved gas turbine engine actuated starter and dryer.

More specifically, the invention relates to an improved method and apparatus employing a gas turbine combined with a compressor for drying materials such as grain, and adapting the system to be self operated by the provision of a self-charging starter system. The invention contemplates the provision of a turbine rotor from which the gases are discharged containing a substantial amount of heat and velocity energy. The gases are discharged through the jet nozzle of a pump or aspirator to mix with ambient air in an intermediate mixing tube and are subsequently forced through a porous container for materials to be dried. Hot operating gases are supplied to the dryer through the turbine from a combustion zone which has a fuel supply means and an igniter and which is supplied with compressed air from a rotary compressor mechanically linked to be driven by the turbine. The compressor is started with air from a compressed air starting tank with the air being admitted to rotate the compressor through a quick-acting starting air valve. An atmospheric air intake flapper type check valve prevents the escape of starting air, and opens automatically when the turbine begins to be self operating. A recharging air bleed line connects from the output of the compressor back to the compressed air starting tank and is provided with a check valve to permit the flow of air from the compressor to the starting tank whereby the tank is automatically recharged to replenish the air lost during the starting period by the compressor during the operating period.

It is accordingly an object of the present invention to provide an improved method and mechanism for the drying of grain and other materials which employs a jet air pump utilizing hot burned gases to pump and mix with outside air.

Another object of the invention is to provide an improved drying mechanism utilizing a gas turbine adapted to discharge the gases with a substantial amount of heat and velocity energy, to provide the energy required for forcing evaporating air through a bed of material to be dried.

Another object of the invention is to provide a complete drying system which is self operating.

Another object of the invention is to provide an improved drying mechanism employing a turbine to supply the velocity and heat energy wherein compressed air starting mechanism is provided for the turbine and means are provided to automatically recharge the starting system during operation of the mechanism.

Another object of the invention is to provide an automatic starting system for a self-operating turbine employing an air compressor whereby the starting system requires only the operation of a starting valve and the escape of air is prevented and the starting system is automatically recharged during the operation of the turbine.

Another object of the invention is to provide an improved compressed air starting system for a turbine wherein the compressed air is automatically replenished during operation of the turbine and wherein the system cannot be accidentally exhausted and rendered inactive by failure to close the starting valve.

Other objects and advantages will become more apparent from the teaching of the principles of the invention in connection with the disclosure of the preferred embodiment thereof in the specification, claims and drawing.

The single figure of the drawing is an elevational view schematically showing the preferred embodiment of the gas turbine actuated starter and dryer.

While the mobile heat source is shown and illustrated in the preferred arrangement, it will be understood that the various features of the invention may be embodied in other circumstances, although the features find particular advantage by utilization in the specific form shown.

In the drawing, the self-operating mobile heat source is shown as combined to force a supply of gas having velocity and temperature energy through a container 10 containing material to be dried, and the container 10 may be for containing grain or like material and is of a depth to provide a bed which can be penetrated by the heated gas and air forced therethrough. For this purpose the walls 12 and 14 may be perforate. It will be understood that the bin may be in a horizontal position with the hot drying gases forced upwardly through the grain or other material. The bin 10 may be provided with an emptying valve 16 at the base and a cover 18 at the top for removing the dried materials and filling with fresh materials.

The gas containing the velocity and temperature energy is supplied from a gas jet pump or aspirator 20. The pump includes a jet nozzle 22 through which the hot gases are ejected to aspirate air through the annular opening 24 surrounding the jet nozzle 22. The amount of air which flows through the opening 24 may be controlled by design or may be controlled by a movable annular valve member 26 which may be moved toward the jet nozzle to cut down the flow of air. The amount of air mixed with the gases ejected from the jet nozzle 22 is determined by the velocity of flow necessary and the temperature to which the gases must be reduced for safe drying of the grain or material in the container 10.

The mixed air and gases flow through an ejector mixing tube 28 wherein they are thoroughly mixed to be at an even temperature. The gases then flow through a diffuser 30 which leads the gases from the mixing tube 28 to the drying container 10.

The gas for operating the jet pump and which is forced through the jet nozzle 22 is supplied from a self-operating turbine mechanism including a turbine rotor 32. The rotor is contained within a housing 34 and gas enters the turbine inlet 36 and is discharged through the outlet 38. The turbine may be of conventional design, but is preferably of a design which will eject gases with a substantial degree of temperature and velocity energy left for the drying operation. The design of the jet pump and the turbine depend upon various factors, such as the temperature of the mixed gas and air required for efficient drying, the velocity of the air and gas necessary for the operation of the turbine and the jet pump and other factors which may be controlled and varied with design, as will be recognized by those skilled in the art. For example, a jet pump turbine may be employed wherein 70% of the available work in the compressed gas are removed in expanding the gas to atmospheric pressure through the turbine and the jet nozzle.

In any event, sufficient power must be provided in order to pump and compress the volume of air required to the pressure required by the jet pump.

The hot gases for operating the turbine and the jet pump are supplied from a combustion chamber 40. The combustion chamber is supplied with fuel through a fuel injector 42 supplied from a fuel line 44. Combustion is initiated in the burner by a starter 46 which may take the form of a spark plug.

Compressed air is forced into the combustion zone or combustion burner 40 to support combustion through the discharge conduit 48 of the rotary compressor 50.

The compressor includes a rotor 52 rotating within the volute shaped rotor housing 54. The intake for the compressor is provided by the conduit 56.

The compressor rotor is mounted on the shaft 60 which links it mechanically to the turbine rotor 32 to be driven thereby. Thus, in the preferred embodiment, the only work output required from the turbine rotor 32 is a sufficient amount of rotor energy to drive the compressor rotor 52 and the remainder of the energy of the hot gases used to drive the air pump 20 and for drying the grain.

The combustion chamber 40 which supplies hot gases for operating the turbine air pump and dryer is combined in the system to provide a self-starting system which automatically recharges itself so that the entire mechanism is self operating.

Starting of the system is provided by a compressed air starting means where the air is maintained in the storage tank 62. The storage tank has an outlet conduit 64 which communicates with the intake conduit 56 for the compressor 50. Flow of air from the starting tank 62 is controlled by a quick-acting starting air valve 66.

The quick-acting valve 66 is opened in order to start the mechanism. When this occurs, the air flows through the volute 54 to rotate the compressor rotor 52 driving it in rotation and operating it as a motor. It in turn starts the turbine rotor 32 spinning and permits the compressed air to pass through the compressor discharge conduit 48 into the combustion chamber 40. Fuel is then injected through the injector 42 and in the presence of the air which will support the combustion, the mixture is ignited by the igniter 46. The hot gases then begin to drive the turbine rotor 32 and when the device becomes self-operating, the quick-acting air valve 66 is turned off.

When starting air is first admitted to the air intake conduit 56 to drive the compressor 50, a check valve 68 closes to prevent the starting air from escaping from the conduit 56. This check valve 68 acts as an atmospheric air intake check valve and is of the hinged type having a freely depending valve flapper 70 which swings upwardly toward the dotted line position with flow of intake air and is slammed closed against a stop 71 when air under pressure is admitted to the conduit 56. As soon as the system becomes self operating, air is drawn into the intake conduit 56 either after the quick-acting valve 66 has been closed, or faster than air can be supplied from the starting tank 62, the check valve 68 will automatically open.

Means may be provided to automatically close the quick-acting starting valve 66. This means operates to sense when the mechanism is self-operating and close the valve 66 in response thereto. An apparatus for operating in accordance with this principle is provided in an automatic valve closing device 72, which is connected to receive pressurized air through an air line 74, which is connected to the valve 66 and the output of the compressor 50. The pressure in the discharge conduit 48 of the compressor will, therefore, be operative to automatically close the quick-acting valve 66.

The starting valve 66 may also be provided with locking means 76, which prevents the valve from accidentally being reopened during operation of the mechanism. This prevents accidental exhausting of the starting tank 62.

However, the compressed air starting tank 62 is provided with automatic recharging means which will operate to return the tank continually during operation of the turbine and compressor to replenish the air used for restarting. An air recharging line 78 connects to the starting tank conduit 64 upstream of the quick-acting starting valve 66. The other end of the recharging line 78 connects to the discharge conduit 48 of the compressor 50 at 80. This connection 80 may also be used to supply the line 74 for shutting off the starting air valve 66 when the machine reaches operating speeds.

A check valve 82 is located in the recharging line 78 to prevent the escape of air from the storage tank 62 when the machine is idle. This check valve, however, permits the flow of air in the opposite direction so that whenever the compressor 50 discharges air at a pressure higher than the pressure of the air in the starting tank 62, air will be bled back to the starting tank to recharge it. The air line 78 has a flow reduction orifice or a reduced portion 79 preventing surges and encouraging a smooth even flow of recharging air. The tendency of air to bleed back to the starting tank will continue all during operation of the compressor 50, and thus the starting tank will be recharged whenever it is emptied. Thus, if the starting valve 66 is not closed immediately when the machine reaches operating conditions, and the starting tank 62 is accidentally permitted to empty itself, the valve 66 can be closed at any later time and the starting tank 62 will then be recharged as long as the compressor 50 is operating.

Thus, it will be seen that we have provided a gas turbine engine actuated starter and dryer which meets the objects and advantages hereinbefore set forth. The mechanism obtains a portable self-operating drying unit which produces gas having heat and velocity energy.

In some instances, it may be desirable to utilize the mechanism for an auxiliary power device. In this instance, more energy will be taken from the gas in the turbine rotor 32 and the shaft 60 will be arranged so that outside power may be taken from it.

In other applications, it may be desired to utilize the mechanism without the grain dryer combination and a high velocity of discharge gases may be employed for uses such as a crop sprayer. The device will be capable of discharging and dispersing a spray mixture of powder or the like to distribute over an extremely large area, and the unit may be mounted on a mobile carrier to distribute the spray over an entire crop.

The mechanism may be further utilized in applications requiring a jet of air gases having considerable energy. For example, the jet horn warning signal may be incorporated with the gas output and may be incorporated in such a manner so that the output may be diverted for short periods of time to operate the horn warning signal.

It will be recognized that the invention obtains a simple and effective method and apparatus which is compact and self operating for drying grains and other materials. The mechanism is especially well adapted to design and structure variations for adaptation to requirements in different circumstances to meet varying demands.

We have, in the drawing and specification, presented a detailed disclosure of the preferred embodiment of our invention but it is to be understood that we do not intend to limit the invention to the specific form disclosed, but intend to cover all modifications, changes and alternative constructions and methods falling within the scope of the principles taught by our invention.

We claim as our invention:

1. A self-operating mechanism for drying grain comprising means for enclosing a bed of grain and provided with openings for the flow of a drying gas, a gas operated jet air pump connected with the output leading to the grain bed and delivering the pumped air and pumping gas to the grain bed, a gas turbine having a driven rotor and an intake and an exhaust connected to the operating jet of the gas pump whereby the hot gas output is mixed with the pumped air and delivered to the bed, a rotary compressor mechanically connected to the turbine in driven relationship thereto and having an air intake and an air discharge, a combustion chamber located between the compressor and the turbine and connected to the discharge of the compressor and to the intake of the turbine, a fuel injection means connected to the combustion chamber, a fuel ignition means in the combustion chamber for starting combustion to operate the turbine, a compressed air starting tank connected to the intake of the compressor, a starting valve means between the compressor intake and the compressed air storage tank to drive the compressor and turbine in rotation for starting, and an air bleed control conduit means connected between the discharge of the compressor and the air starting tank and including a control valve preventing flow through the conduit from the tank to the compressor outlet and automatically opening when the compressor pressure exceeds the pressure in the tank whereby the tank is automatically filled with compressed air when the starting valve is closed and the compressor is driven by the turbine during operation.

2. A self operating starting mechanism for a device employing a gas turbine comprising a rotary operating turbine mounted on a drive shaft and operated by heated driving gas, a combustion chamber supporting combustion therein and connected to provide the operating gas for the turbine, a fuel supply means connected to the combustion chamber, an air compressor driven from the turbine shaft and having an air intake and an air discharge connected for supplying compressed air to the combustion chamber, a compressed air starting tank connected to deliver air to the compressor through said air intake and drive it in rotation for starting the turbine, a control valve operable for starting and positioned between the compressed air starting tank and the compressor, means connected in the air intake for preventing the escape of compressed starting air insuring flow through the compressor when said control valve is open, and a recharging line connected to return air discharged from the compressor to the compressed air starting tank during operation of the turbine when the compressor is being driven by the turbine whereby the compressed air which is lost from the starting tank during starting is replenished through the recharging line for each operation.

3. A self charging starting mechanism for use with a system providing heated oprating gases for a compressor or the like which comprises a combustion chamber in which fuel is burned to increase the temperature of gases, a fuel supply leading to the combustion chamber, a compressor delivering compressed air to the combustion chamber, a compressed air starting tank connected to deliver air to the intake of the compressor for driving it during a starting period to increase the pressure in the combustion chamber, a recharging air conduit leading between the compressed air starting tank and the output of the compressor whereby air may be returned from the compressor to the starting tank when the compressor is driven, means for driving the compressor in rotary operation, and a return flow preventing check valve in the recharging conduit operative to permit the flow of replenishing air from the compressor discharge to the starting tank but retaining air in the starting tank when the compressor is idle and the pressure at the discharge side is below the pressure in the starting tank.

4. A gas turbine combination comprising a turbine rotor located in an operating chamber with a gas intake and gas discharge, a combustion chamber connected to the turbine rotor intake, fuel supply means leading to the combustion chamber for heating gases therein, a rotary air compressor mechanically connected to be driven by the turbine rotor and connected to discharge to the combustion chamber, a compressed air starting tank connected to the intake of the rotary air compressor for driving the compressor during a starting period to build up pressure in the combustion chamber, a quick-acting starting air valve positioned between the starting tank and the rotary gas compressor whereby compressed air is directed to the compressor during the starting period, an air bleed recharging line connected between the rotary compressor discharge and the compressed air starting tank whereby recharging air may flow from the compressor discharge to the starting tank when the compressor is driven by the gas turbine to replenish the starting air removed from the starting tank, a self acting check valve positioned in the air bleed line, and operative to prevent a flow of air from the statring tank to the discharge of the compressor and permitting the flow of air in the opposite direction for recharging the starting tank, said check valve being opened with the pressure differential between the compressor discharge and the air storage tank whereby the starting tank may be recharged at any time during the operation of the compressor and whereby said starting air valve may be automatically closed at the time of operation of the compressor by the turbine.

5. An automatic starting system for apparatus producing hot gases for a turbine or the like comprising a turbine and compressor assembly linked mechanically whereby the turbine drives the compressor, a combustion chamber connected to receive compressed air from the compressor to deliver heated gas to the turbine, a fuel supply means leading to the combustion chamber, an atmospheric air intake check valve connected to the compressor intake whereby air may freely flow into the compressor when it is driven by the turbine, a compressed air starting means connected to the intake of the compressor and the check valve whereby the check valve will automatically close when compressed air is forced through the compressor, and automatic recharging means for the compressed air starting means operative to replenish the air used for each starting operation.

6. A starting mechanism for apparatus producing heated gases for driving a turbine or the like comprising a combustion chamber wherein gases are heated, a fuel supply means connected to the combustion chamber for supporting combustion, a turbine compressor unit connected to the combustion chamber with the turbine receiving the heated operating gases therefrom and the compressor discharging compressed air to the combustion chamber, an atmospheric air intake valve on the compressor intake wherein the check valve automatically opens when the compressor is driven and is automatically closed with back pressure from the compressor, a compressed air starting tank connected to the intake of the compressor downstream from the check valve, a quick acting starting air valve between the compressed air starting tank and the compressor wherein air may be admitted to operate the compressor for starting, a recharging air bleed line connected to the discharge of the compressor and connected to the compressed air starting tank between the starting air valve and the tank whereby the compressor recharges the tank when operated by the turbine to replenish the air used for starting, and a check valve in the recharging line operative to prevent the flow of air to the discharge side of the compressor when the compressor is idle but permitting the flow of air from the compressor to the starting tank for recharging operation.

7. A gas turbine provided with an intake and provided with an exhaust nozzle for the discharge of exhaust gases, a combustion burner connected to the intake of the turbine, a fuel supply leading to the combustion burner, means for igniting the fuel within the burner, a compressor connected to the burner to force compressed air therein and having its discharge connected to the burner and provided with an air intake, a compressed air storage tank connected to the intake of the compressor for operating the compressor during a starting period, means for preventing the escape of air through the intake when starting air is directed to the compressor, a recharging air line connected to direct the compressed air from the compressor to the starting tank whereby the starting air is replenished during a running period, a quick-acting starting valve connected to the air storage tank and operative to control the flow of air to start the compressor, and automatic means connected to sense when the start has been accomplished and the turbine reaches operating conditions and connected to the starting air valve to close the valve after the start.

8. The method of starting a turbine having a combustion chamber and having an air supply compressor connected to the combustion chamber and mechanically driven by the turbine which comprises the steps of directing a stream of starting air from a pressurized air supply reserve to flow to the compressor for rotatably driving the compressor so that the turbine will be rotated to a starting speed, directing the starting air through the combustion chamber and then directing the starting air through the turbine, stopping said stream of air after a turbine starting period, and bleeding a quantity of air from the output of the compressor to the air supply reserve during a running period of the compressor until a quantity substantially equal to the quantity used for starting has been returned to replenish the air used during the starting period.

References Cited in the file of this patent

UNITED STATES PATENTS

| | | |
|---|---|---|
| 1,854,615 | Lasley | Apr. 19, 1932 |
| 2,365,551 | Hermitte | Dec. 19, 1944 |
| 2,700,830 | Wolfe | Feb. 1, 1955 |

FOREIGN PATENTS

| | | |
|---|---|---|
| 366,773 | Great Britain | Feb. 11, 1932 |